(12) United States Patent
Ganesan et al.

(10) Patent No.: US 7,730,192 B2
(45) Date of Patent: Jun. 1, 2010

(54) MANAGING PARALLEL REQUESTS IN A COMMUNICATIONS ENVIRONMENT SUPPORTING SERIAL AND PARALLEL REQUEST HANDLERS

(75) Inventors: Krishnamurthy Ganesan, Redmond, WA (US); Adrian Potra, Bellevue, WA (US); Sundaram Anantharaman, Redmond, WA (US); Paul D. Tidwell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 11/385,264

(22) Filed: Mar. 20, 2006

(65) Prior Publication Data

US 2007/0220148 A1 Sep. 20, 2007

(51) Int. Cl.
*G06F 15/16* (2006.01)
*G06F 15/173* (2006.01)
(52) U.S. Cl. ........................ 709/228; 709/226; 709/201
(58) Field of Classification Search ................. 709/226, 709/227
See application file for complete search history.

(56) References Cited

U.S. PATENT DOCUMENTS

| 4,823,304 | A | * | 4/1989 | Frantz et al. ................. 709/232 |
| 5,335,347 | A | * | 8/1994 | Foss et al. .................... 719/314 |
| 5,666,256 | A | * | 9/1997 | Zavis et al. .................. 361/115 |
| 5,699,523 | A | * | 12/1997 | Li et al. ....................... 709/238 |
| 5,712,624 | A | * | 1/1998 | Ayerst et al. ............ 340/825.21 |
| 5,812,768 | A | * | 9/1998 | Page et al. ................... 709/228 |
| 5,854,898 | A | | 12/1998 | Riddle |
| 5,960,178 | A | * | 9/1999 | Cochinwala et al. ........ 709/232 |
| 6,009,175 | A | * | 12/1999 | Schanze ..................... 713/155 |
| 6,138,168 | A | * | 10/2000 | Kelly et al. .................. 719/310 |
| 6,192,029 | B1 | * | 2/2001 | Averbuch et al. ............ 370/229 |
| 6,226,666 | B1 | * | 5/2001 | Chang et al. ................. 709/202 |
| 6,385,644 | B1 | * | 5/2002 | Devine et al. ............... 709/206 |
| 6,678,735 | B1 | | 1/2004 | Orton et al. |
| 6,714,979 | B1 | * | 3/2004 | Brandt et al. ............... 709/225 |
| 6,721,288 | B1 | * | 4/2004 | King et al. .................. 370/310 |
| 6,742,042 | B1 | | 5/2004 | Holden et al. |
| 6,769,014 | B1 | * | 7/2004 | Chang et al. ................ 709/206 |
| 6,928,150 | B2 | | 8/2005 | Johnston |
| 6,985,754 | B1 | * | 1/2006 | Pedersen et al. ......... 455/556.2 |

(Continued)

OTHER PUBLICATIONS

Handley et al., SDP: Session Description Protocol, RFC 2327, (Apr. 1998).*

(Continued)

*Primary Examiner*—Saleh Najjar
*Assistant Examiner*—Robert Shaw
(74) *Attorney, Agent, or Firm*—Perkins Coie LLP

(57) ABSTRACT

A facility is described for managing parallel requests in a communications environment having devices or applications ("request handlers") that support serial and parallel message processing. In various embodiments, the facility receives messages directed to a recipient from an application and sends a first message to the recipient without sending subsequently received messages to the recipient. Upon receiving a response from the recipient to the first message, the facility determines whether the recipient supports parallel or serial message processing. When the recipient supports parallel message processing, the facility sends the subsequently received messages to the recipient without awaiting a response to a message before sending another message. When the recipient supports serial message processing, the facility sends a subsequent message after receiving a response to a previously sent message.

16 Claims, 12 Drawing Sheets

U.S. PATENT DOCUMENTS

| | | | | |
|---|---|---|---|---|
| 7,177,918 | B2* | 2/2007 | Joshi et al. | 709/219 |
| 7,225,249 | B1* | 5/2007 | Barry et al. | 709/227 |
| 7,272,651 | B1* | 9/2007 | Bolding et al. | 709/227 |
| 7,275,079 | B2* | 9/2007 | Brodsky et al. | 709/203 |
| 7,284,059 | B2* | 10/2007 | Isozu | 709/227 |
| 7,415,284 | B2* | 8/2008 | Hoover et al. | 455/518 |
| 2001/0047401 | A1* | 11/2001 | McTernan et al. | 709/219 |
| 2001/0052006 | A1* | 12/2001 | Barker et al. | 709/223 |
| 2002/0112070 | A1* | 8/2002 | Ellerbrock et al. | 709/238 |
| 2002/0138569 | A1* | 9/2002 | Slutsman et al. | 709/204 |
| 2002/0161828 | A1* | 10/2002 | Edison et al. | 709/203 |
| 2002/0194331 | A1 | 12/2002 | Lewis et al. | |
| 2003/0108000 | A1 | 6/2003 | Chaney et al. | |
| 2003/0135569 | A1* | 7/2003 | Khakoo et al. | 709/206 |
| 2003/0145054 | A1 | 7/2003 | Dyke | |
| 2003/0163585 | A1* | 8/2003 | Elderon et al. | 709/246 |
| 2004/0024879 | A1* | 2/2004 | Dingman et al. | 709/227 |
| 2004/0117801 | A1* | 6/2004 | Eibach et al. | 719/314 |
| 2004/0221292 | A1* | 11/2004 | Chiang et al. | 719/310 |
| 2005/0055687 | A1 | 3/2005 | Mayer | |
| 2005/0060720 | A1 | 3/2005 | Mayer | |
| 2005/0080925 | A1* | 4/2005 | Staiger | 709/239 |
| 2005/0094621 | A1 | 5/2005 | Acharya et al. | |
| 2005/0141483 | A1 | 6/2005 | Wengrovitz | |
| 2005/0144277 | A1* | 6/2005 | Flurry et al. | 709/225 |
| 2005/0144278 | A1* | 6/2005 | Atamaniouk | 709/225 |
| 2005/0198127 | A1* | 9/2005 | Helland et al. | 709/204 |
| 2005/0203994 | A1* | 9/2005 | Palmer et al. | 709/203 |
| 2005/0232229 | A1 | 10/2005 | Miyamoto et al. | |
| 2006/0075096 | A1* | 4/2006 | Ueda et al. | 709/224 |
| 2006/0121919 | A1* | 6/2006 | Amishima et al. | 455/466 |
| 2006/0165060 | A1* | 7/2006 | Dua | 370/352 |
| 2006/0230161 | A1* | 10/2006 | Bae et al. | 709/228 |
| 2007/0054686 | A1* | 3/2007 | Allen et al. | 455/518 |
| 2007/0118601 | A1* | 5/2007 | Pacheco | 709/206 |
| 2007/0255784 | A1* | 11/2007 | Takechi et al. | 709/203 |
| 2008/0086564 | A1* | 4/2008 | Putman et al. | 709/227 |
| 2008/0254796 | A1* | 10/2008 | Kim et al. | 455/436 |

OTHER PUBLICATIONS

Sparks, R., "The Session Initiation Protocol (SIP) Refer Method," RFC 3515.*

J. Rosenberg et al. SIP: Session Initiation Protocol, RFC 3261, Jun. 2002.*

J. Rosenberg et al., Indicating User Agent Capabilities in the Session Initiation Protocol (SIP), RFC 3840, Aug. 2004.*

Sparks, R., The Session Initiation Protocol (SIP) Refer Method, Network Working Group, Request for Comments 3515, Apr. 2003 (23 pages).

Sparks, R., Johnston, A., Petria, D., "Session Initiation Protocol Call Control—Transfer," Sipping WG, Jul. 17, 2005 (55 pages).

Asprino, P., Vitiello, P., Fresa, A., Longo, M., "Implementation of a Conference Service in a 3G Architecture," 2002 (5 pages).

Roach, Adam, "SIP-Specific Event Notification," Internet Engineering Task Force, Feb. 2002 (36 pages).

* cited by examiner

| No. | URI | CSeq | Refer Status Object |
|---|---|---|---|
| 1 | 128.51.120.8 | 12 | object 1 |
| 2 | 128.52.125.2 | 1 | object 2 |
| 3 | 128.52.125.2 | 4 | object 3 |
| ⋮ | ⋮ | ⋮ | ⋮ |

MANAGING PARALLEL REQUESTS IN A COMMUNICATIONS ENVIRONMENT SUPPORTING SERIAL AND PARALLEL REQUEST HANDLERS

BACKGROUND

Participants in networked communications environments sometimes need to communicate with one another, such as to exchange requests and responses containing results of the requests. Participants are applications, users, and generally any entity that uses communications services provided by the networked communications environment. As an example, a client participant (e.g., an application executing on a computing device) may send requests for services to a server participant (e.g., a network service or application executing on another computing device). The server participant may send to the client participant a response containing results of the service request. An endpoint is a device or software that represents a participant in the networked communications environment. Each participant can have multiple endpoints through which it can send and receive communications. As an example, a user or application can use a mobile computer as an endpoint as well as a desktop computer as an endpoint. The participants employ a source endpoint to send communications to a target endpoint and employ a target endpoint to receive communications sent by a source endpoint.

The endpoints may employ various mechanisms to communicate messages containing requests and responses, such as a Session Initiation Protocol ("SIP"). SIP is an application-layer control protocol that endpoints can use to discover one another and to establish, modify, and terminate communications sessions. SIP is an Internet-proposed standard. Its specification, "RFC 3261," is available at the Internet Engineering Task Force's web site (www.ieff.org). This specification is incorporated herein in its entirety by reference. An exchange of messages during a SIP session is generally referred to as a dialog. SIP may use lower-level communications layers to transport a dialog's messages, such as Transmission Control Protocol/Internet Protocol ("TCP/IP"), which are commonly employed transport- and network-layer protocols.

Some participants support parallel requests whereas others support requests serially. When a server participant supports parallel requests, it can receive multiple requests even though it has not serviced (e.g., responded to) an earlier request. In contrast, when a server participant supports requests serially, it needs to respond to an earlier request before processing a subsequent request. Client participants may have insufficient information to determine whether to wait for a response to a request before sending another request or to send all pending requests and await multiple responses. As an example, a client participant provided by a vendor that sends a request to a server participant may need to send multiple requests to a server participant provided by another vendor. When requests can be sent in parallel, responses may be received in a timely manner.

SUMMARY

A facility is described for managing parallel requests in a communications environment having devices or applications ("request handlers") that support serial and parallel message processing. The facility determines whether a request handler supports multiple requests in parallel or in serial by sending a message (e.g., a request) containing an identifier and determining whether the request handler returns an indication of the identifier in a response. When the request handler returns the identifier, the facility determines that the request handler supports parallel requests. Request handlers that do not return the identifier are determined to support only serial requests. When first sending a request, or if the request handler has not been determined to be capable of handling multiple requests in parallel, the facility enqueues requests it receives from an application or other user of the facility, but sends each request to the request handler only after it receives a response to a request it previously sent. Upon determining that the request handler supports multiple requests in parallel, the facility sends all enqueued requests to the request handler. The facility may provide an application program interface that enables applications to assume that the request handler can handle requests in parallel. The facility enqueues the requests until it determines whether the request handler supports parallel requests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
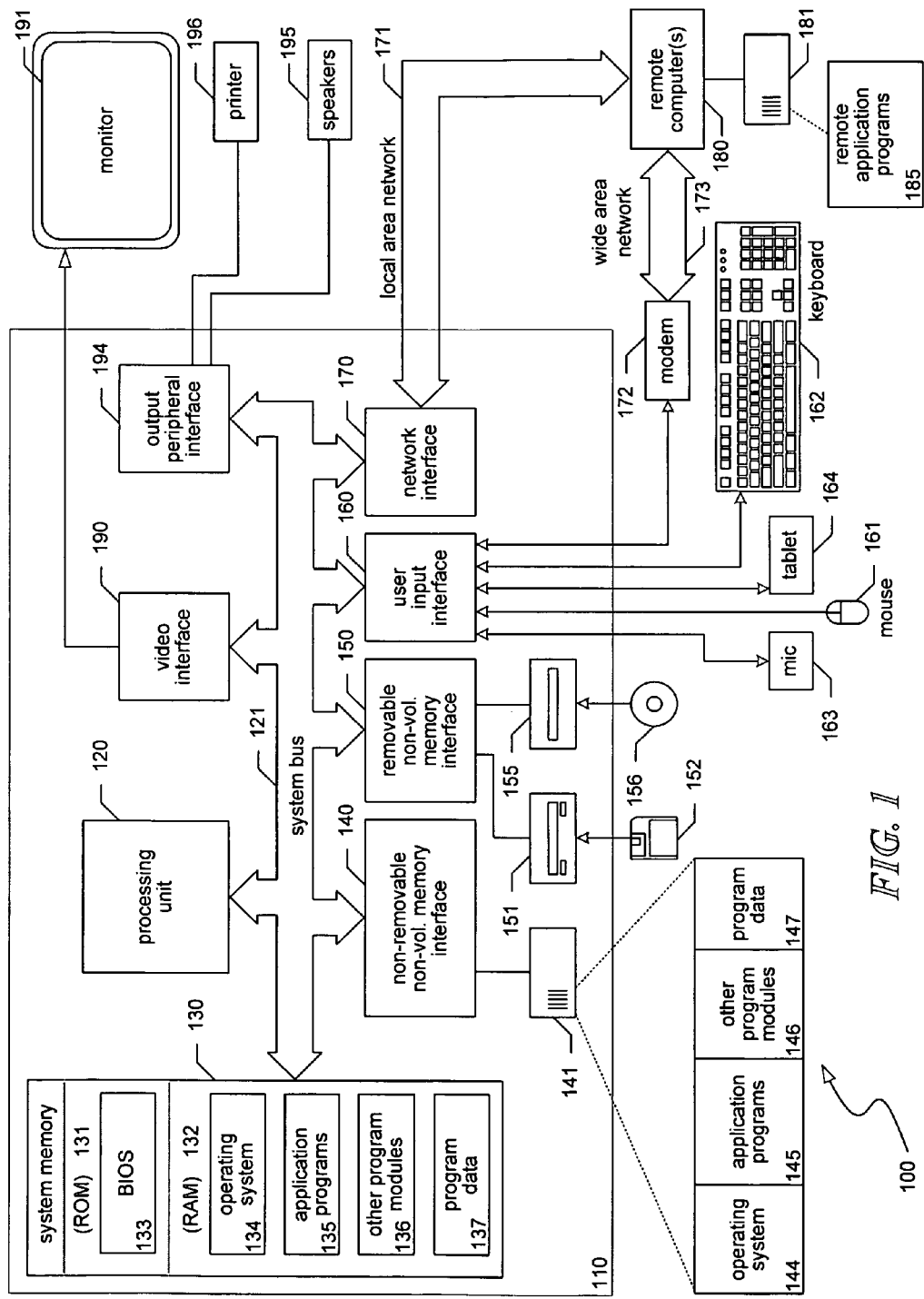
FIG. 1 is a block diagram illustrating an example of a suitable computing environment in which the facility may operate.

A facility is described for managing parallel requests in a communications environment having devices or applications ("request handlers") that support serial and parallel message processing. In various embodiments, the facility determines whether a request handler supports multiple requests in parallel or requests in serial by sending a message (e.g., a request) containing an identifier and determining whether the request handler returns an indication of the identifier in a response. When the request handler returns the identifier, the facility determines that the request handler supports parallel requests. Request handlers that do not return the identifier are determined to support only serial requests. As an example, endpoints can send and receive SIP REFER and NOTIFY messages. An application can invoke a method of an application program interface ("API") provided by the facility to send multiple requests without needing information about whether the request handler that processes the requests can receive and process multiple requests in parallel. When invoking the API method, the application indicates a request handler, such as by providing a uniform resource identifier ("URI") of the request handler. The facility creates a REFER message containing the request, adds an identifier to a CSeq header field of the message, and sends the REFER message containing the request to the indicated request handler. The request handler receives the REFER message, processes the request, and invokes an API method provided by the facility to return a response. The API method that returns the response creates a NOTIFY message containing the response, adds the CSeq identifier to an Event ID header field of the message, and returns the NOTIFY message to the endpoint that sent the REFER message. By analyzing the NOTIFY message to determine whether the CSeq identifier was included in the Event ID header field, the facility determines whether the endpoint that sent the response supports requests in parallel.

The REFER message may initially be processed by a Referrer computing device. A Referrer computing device receives a REFER message, selects one of several computing devices that should handle the REFER message, and forwards the received REFER message to the selected computing device.

When first sending a request, or if the request handler has not been determined to be capable of handling multiple requests in parallel, the facility enqueues requests it receives from an application or other user of the facility, but sends each request to the request handler only after it receives a response to a request it previously sent. Upon determining that the request handler supports multiple requests in parallel, the facility sends all enqueued requests to the request handler.

Some event handlers may not employ the facility to return responses. In such cases, the event handler may not provide the Event ID header field containing the CSeq identifier. Such event handlers are presumed to handle requests serially.

The facility initially enqueues messages for sending to the request handler and sends a request only after receiving a response to a request it previously sent to the request handler. When the request handler provides, in a NOTIFY message, an Event ID header field containing the CSeq identifier, the facility determines that the request handler can handle multiple requests in parallel and sends all subsequently enqueued requests to the request handler.

Thus, the facility manages parallel requests in a communications environment supporting serial and parallel request handlers. Applications that employ the facility need not have information relating to whether request handlers can handle parallel requests or not.

The facility may provide an application program interface that enables applications to assume that the request handler can handle requests in parallel. The facility enqueues the requests until it determines whether the request handler supports parallel requests.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary computing system 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set-top boxes, programmable consumer electronics, network PCs, minicomputers, mainframe computers, routers, switches, access points, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media, including memory storage devices.

With reference to FIG. 1, an exemplary system for implementing the facility includes a general purpose computing device in the form of a computer 100. Components of the computer 100 may include, but are not limited to, a processing unit 120, a system memory 130, and a system bus 121 that couples various system components, including the system memory 130 to the processing unit 120. The system bus 121 may be any of several types of bus structures, including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The computer 100 typically includes a variety of computer-readable media. Computer-readable media can be any available media that can be accessed by the computer 100 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information, such as computer-readable instructions, data structures, program modules, or other data. Computer storage media include, but are not limited to, RAM, ROM, EEPROM, flash memory or other memory technology; CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 100. Communications media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory, such as read only memory (ROM) 131 and random access memory (RAM) 132. A basic input/output system (BIOS) 133, containing the basic routines that help to transfer information between elements within the computer 100, such as during startup, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 100 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary computing system environment 110 include, but are not limited to, magnetic tape cassettes, flash memory cards, digital versatile disks, digital video tapes, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 100. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 100 through input devices, such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 100 is incorporated, such as in a tablet-type personal computer. In addition, computing devices such as the computer 100 may also include other peripheral output devices such as speakers 195 and a printer 196, which may be connected through an output peripheral interface 194 or the like.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 100 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 100, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

Figure 2:
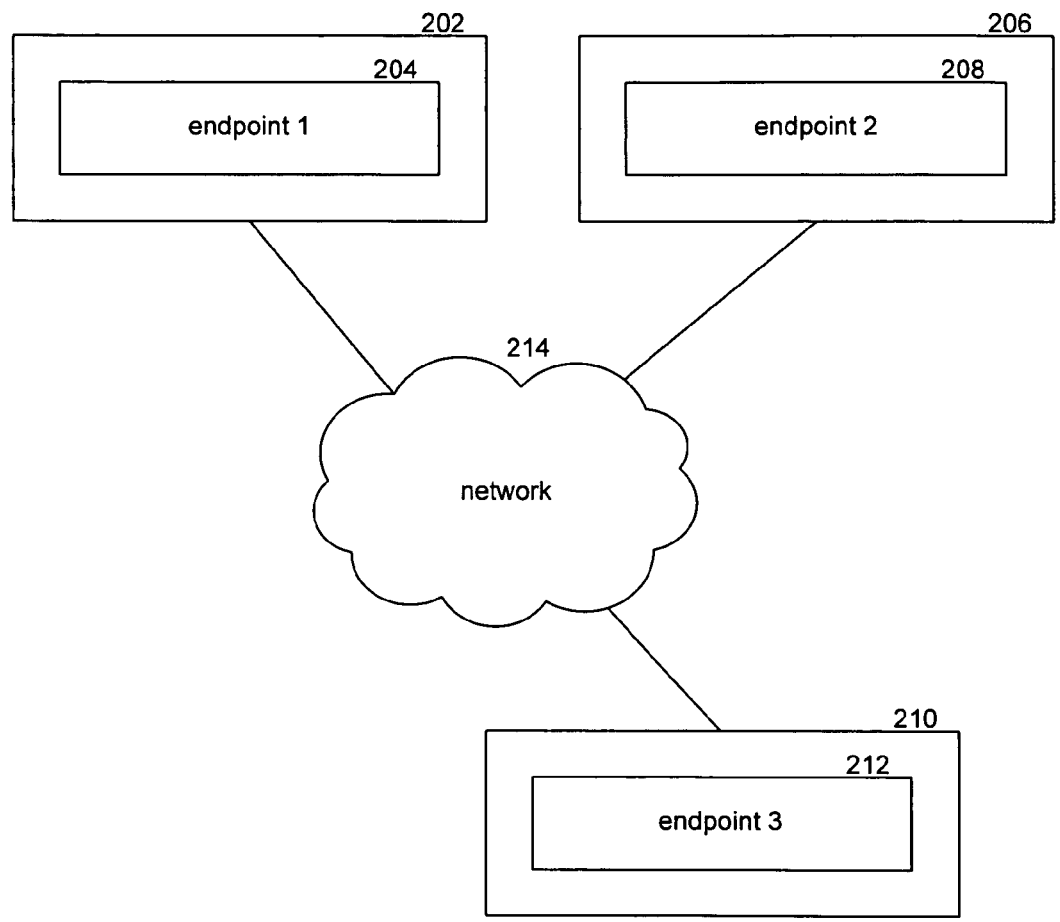
FIG. 2 is a block diagram illustrating an example of a suitable environment in which the facility may operate in some embodiments.

FIG. 2 is a block diagram illustrating an example of a suitable environment in which the facility may operate in some embodiments. The facility comprises multiple computing devices, such as computing devices 202, 206, and 210. The computing devices may be similar to the computer described above in relation to FIG. 1. Each computing device may have one or more endpoints, such as endpoints 204, 208, and 212. The endpoints are associated with user logins and represent the initiating or terminating ends of communications messages, such as SIP messages. So that they can exchange communications messages, the computing devices are generally interconnected via a data communications network 214, such as an intranet or the Internet. In various embodiments, multiple data communications networks may be employed.

Figure 3:
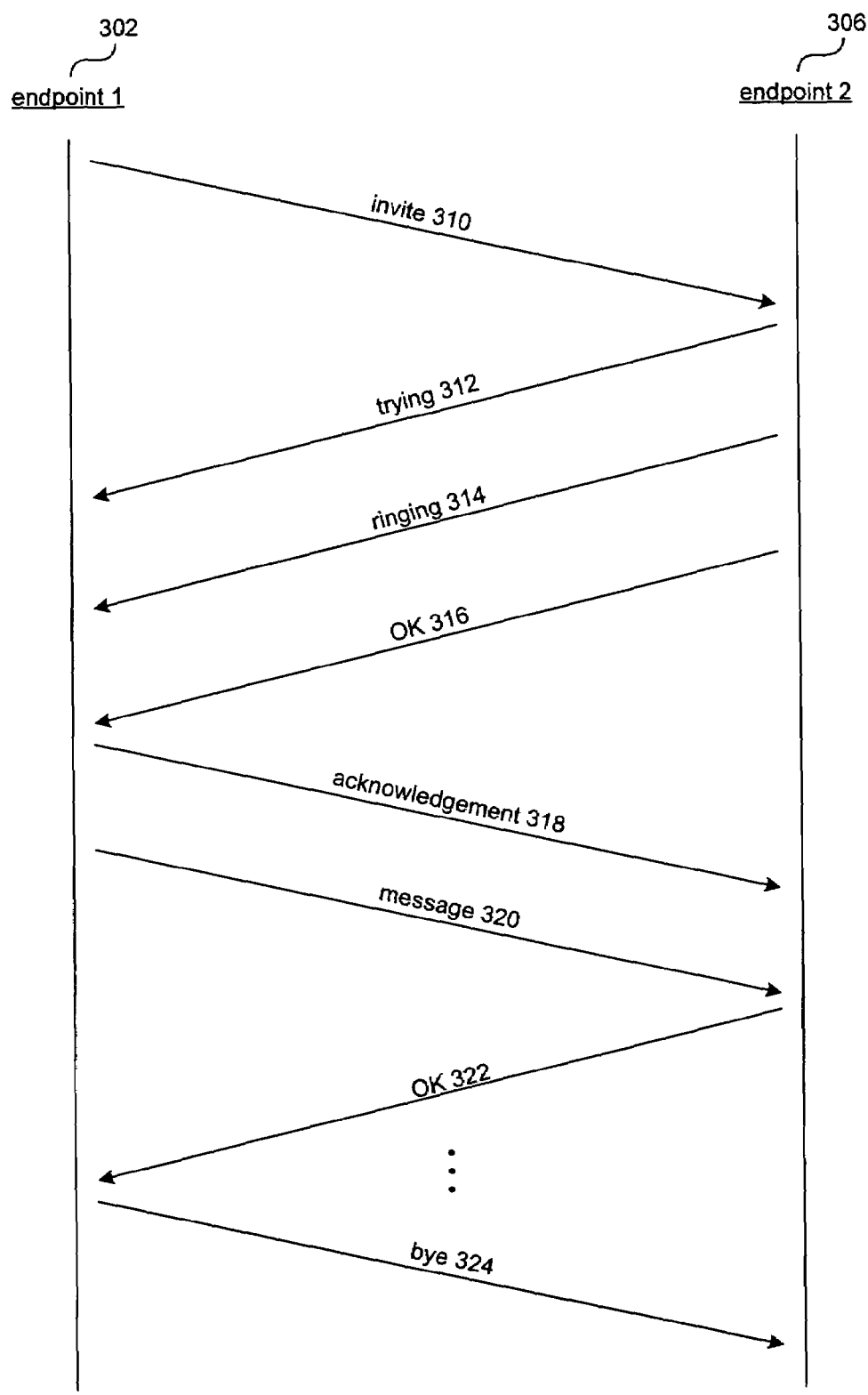
FIGS. 3-4 are message flow diagrams illustrating message flows in a session initiation protocol communications model.
Figure 4:
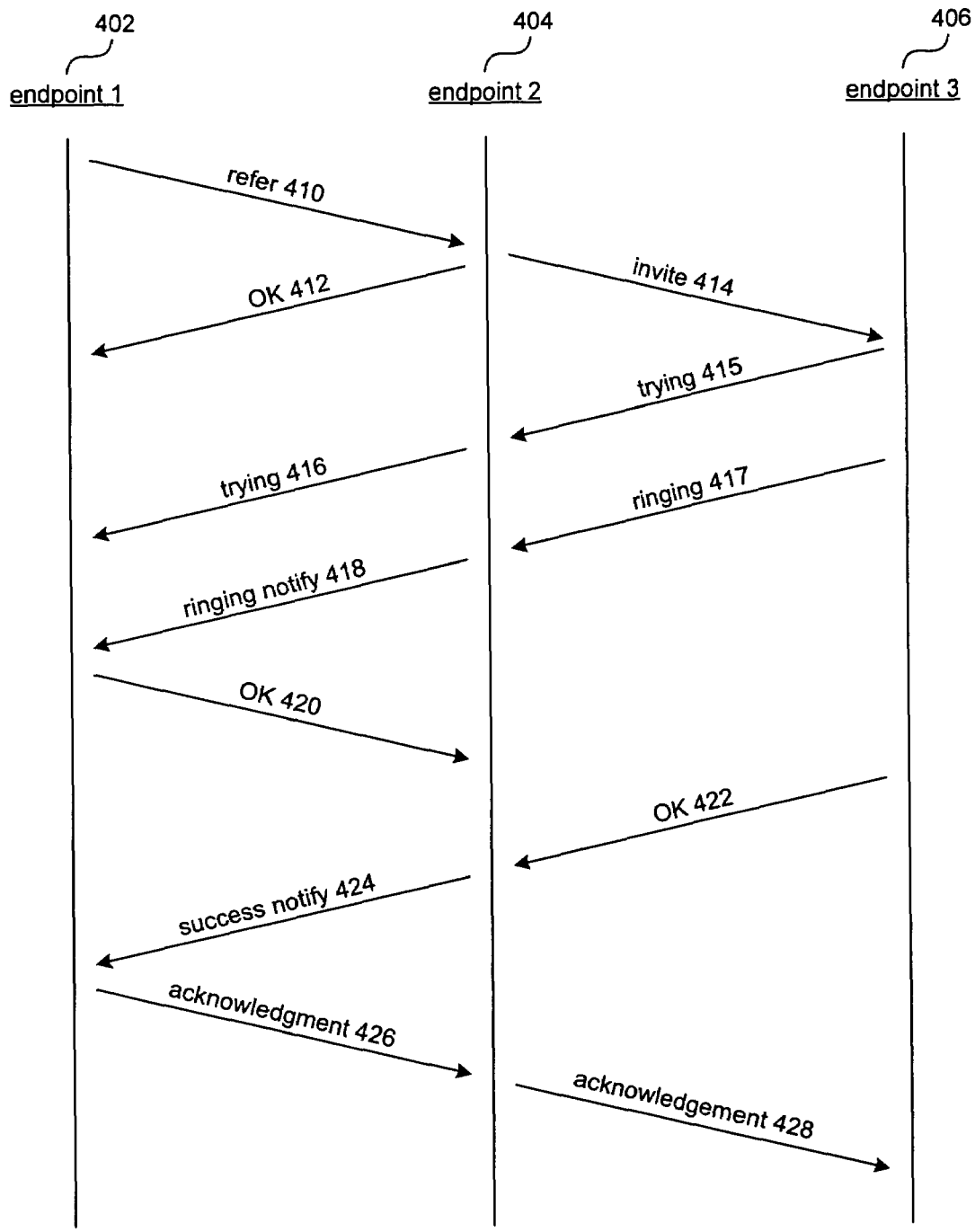

FIGS. 3s-4 are message flow diagrams illustrating message flows in a session initiation protocol communications model. The reference numbers in paragraphs describing FIGS. 1-13 correspond to reference numbers indicated in the Figures. In particular, reference numbers in the following paragraphs relating to FIGS. 3-4 do not correspond to SIP codes contained by SIP messages whose flow is illustrated in these Figures.

FIG. 3 illustrates a conventional SIP message flow. An initiator endpoint 302 ("endpoint 1") initiates a SIP conversation by sending an INVITE message 310 to a recipient endpoint 306 ("endpoint 2"). Upon receiving the message, endpoint 2 responds with a TRYING message 312. Endpoint 2 may then send a ringing message 314 and, when the session is established, endpoint 2 responds with an OK message 316. Endpoint 1 then sends an acknowledgment message 318 to endpoint 2. Endpoints 1 and 2 have then established a session and can exchange messages that form a dialog or conversation. As an example, endpoint 1 may send one or more messages 320 to which endpoint 2 may respond with OK messages 322. The dialog or conversation can then be ended by either endpoint 1 or endpoint 2 by sending a bye message 324. The figure illustrates a bye message sent by endpoint 1 to endpoint 2.

FIG. 4 illustrates a SIP message flow when a referrer is used. An initiator endpoint 402 ("endpoint 1") initiates a SIP conversation with endpoint 406 ("endpoint 3") via a referrer endpoint 404 ("endpoint 2"). Endpoint 1 initiates the conversation by sending a REFER message 410 to endpoint 2. The refer message indicates a URI identifying endpoint 3 or a service provided by endpoint 3. Endpoint 1 may need to interact with endpoint 2 instead of endpoint 3 directly when, for example, a network administration rule prevents endpoints 1 and 3 from establishing direct communications, endpoint 1 has insufficient information to send messages directly to endpoint 3, and so forth. Upon receiving the REFER message, endpoint 2 returns an OK message 412 to endpoint 1 and also sends an INVITE message 414 to endpoint 3.

Upon receiving the INVITE message, endpoint 3 returns a TRYING message 415 to endpoint 2 and endpoint 2 then returns a TRYING message to endpoint 1. Endpoint 3 may then send a RINGING message 417 to endpoint 2, which then sends a RINGING NOTIFY message 418 to endpoint 1. Endpoint 1 then may respond with an OK message 420 to endpoint 2.

When endpoint 3 sends an OK message 422 to endpoint 2 to indicate that a session has been created, endpoint 2 sends a SUCCESS NOTIFY message 424 to endpoint 1. Endpoint 1 may send an acknowledgment message to endpoint 2 when then sends an acknowledgment message 428 to endpoint 3.

These messages may all be indicated as related using a conversation ID (e.g., a sequence number or other identifier). As an example, the REFER message 410 may contain a CSeq identifier that is subsequently used in many or all of the messages corresponding to establishing the session.

Figure 5:
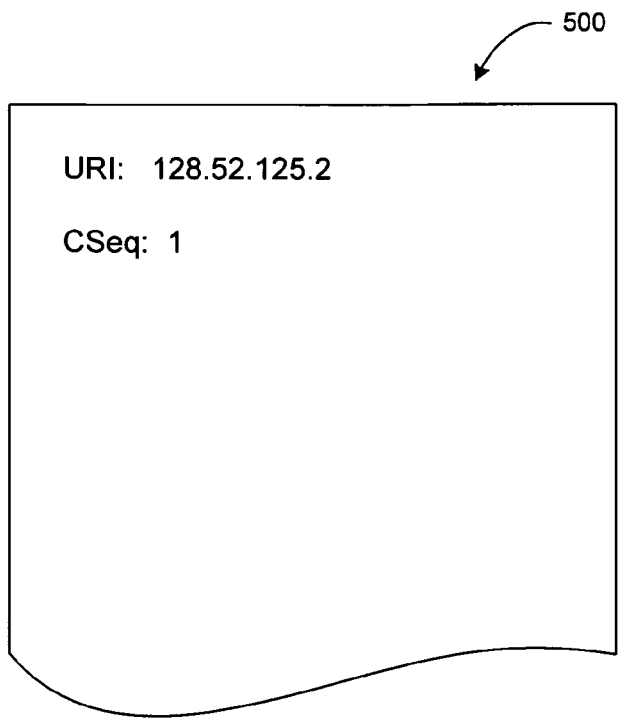
FIGS. 5-6 are message diagrams indicating portions of messages sent or received by the facility in various embodiments.
Figure 6:
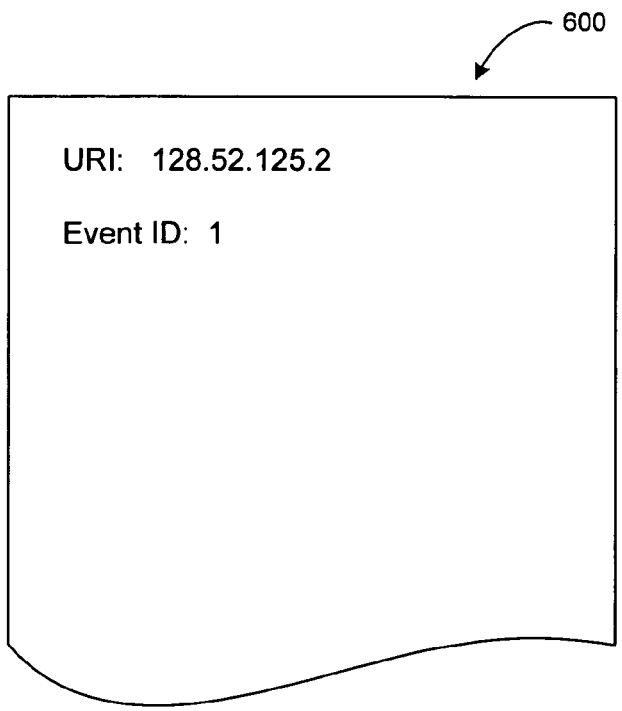

FIGS. 5-6 are message diagrams indicating portions of messages sent or received by the facility in various embodiments.

FIG. 5 illustrates a REFER message 500. The REFER message contains in its header URI and CSeq fields. The URI field indicates an identifier of an endpoint with which the sender of the REFER message is requesting to establish a session. The CSeq field uniquely identifies the session, at least as far as the sender of the REFER message is concerned. That is, a different sender may employ an identical CSeq identifier. The REFER message may also contain additional header fields and payload (not shown).

FIG. 6 illustrates a NOTIFY message 600. The NOTIFY message contains in its header URI and Event ID fields. The URI field indicates the identifier of the endpoint that is responding to the NOTIFY message. The Event ID field indicates the session's unique identifier, such as the CSeq identifier provided in the REFER message.

In some embodiments, the Event ID field is an Event field with an ID parameter. As an example, the actual contents of the Event field may be: "REFER; ID=1".

Some implementations of SIP do not provide Event ID fields.

Figure 7:
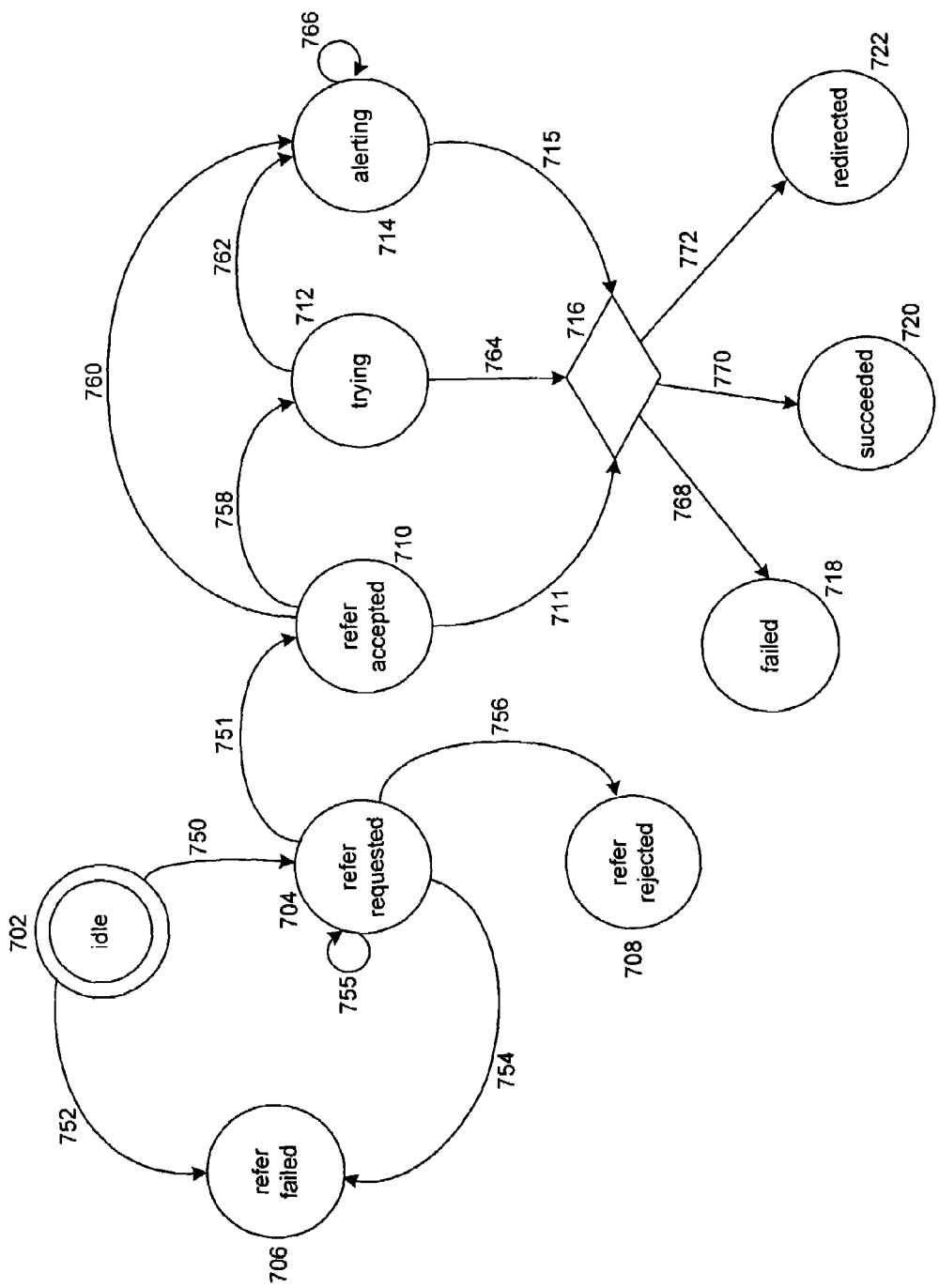
FIG. 7 is a state diagram illustrating states associated with components of the facility in various embodiments.

FIG. 7 is a state diagram illustrating states associated with components of the facility in various embodiments. An endpoint sending or receiving a REFER message may have states indicated by the state diagram. The component (e.g., the endpoint) can move from one state to another via an arc connecting two states.

According to the state diagram, the endpoint is initially in an idle state 702. From the idle state, the endpoint can move to a refer requested state 704 or a refer failed state 706. The endpoint moves to the refer requested state upon sending 750 a REFER message. Alternatively, the endpoint moves to the refer failed state when it encounters 752 a communications error, such as when it is unable to send a REFER message.

The endpoint can move from the refer requested state to the refer failed state, a refer rejected state 708, or a refer accepted state 710. The endpoint can also remain at the refer requested state, such as when it receives 755 responses containing SIP informational return codes 100-199. Examples of informational return codes are Trying (SIP code 100), Ringing (SIP code 180), Call Is Being Forwarded (SIP code 181), and Queued (SIP code 182).

The endpoint can move from the refer requested state to the refer failed state when it encounters 754 a communications error, such as when a timeout occurs after the time it sent a REFER message. A timeout can occur when the endpoint receives no response to the REFER message it sent. Alternatively, the endpoint may move to the refer failed state when a communications error occurs.

The endpoint can move from the refer requested state to the refer rejected state when it receives 756 a SIP response indicating various error conditions, such as Redirection messages (SIP codes 300-399), Client Errors (SIP codes 400-499), Server Errors (SIP codes 500-599), or other Global Failures (SIP codes 600-699). Redirection messages would be considered to be a failure because REFER messages are generally sent in an existing dialog, and so redirects would not occur.

The endpoint can move from the refer requested state to the refer accepted state when it receives 751 a SIP message with SIP code 202 (success) or any other NOTIFY message. From the refer accepted state, the endpoint can move to a trying state 712, alerting state 714, or, upon making a decision at decision block 716, to failed 718, succeeded 720, or redirected 722 states.

The endpoint can move from the refer accepted state to the trying state upon receiving or sending 758 a NOTIFY message, generally containing a Trying indication (SIP code 100).

The endpoint can move from the refer accepted state to the alerting state when a NOTIFY message containing SIP informational codes 101-199 is sent or received 760. The endpoint can also move from the trying state to the alerting state upon receiving or sending 762 a NOTIFY message containing SIP informational codes 101-199. The endpoint can remain at the alerting state when it receives or sends 766 a NOTIFY message containing SIP informational codes 101-199.

The endpoint can move from the refer accepted, trying, or alerting states to a failed 718, succeeded 720, or redirected 722 state depending on the SIP code contained in a subsequently received or sent NOTIFY message. This is indicated by decision block 716 and arcs 711, 764, and 715. If the endpoint sends or receives a NOTIFY message containing SIP codes 400-699, it moves to the failed state via arc 768 because a Client Error, Server Error, or other Global Error was encountered. If the endpoint sends or receives a NOTIFY message containing SIP codes 200-299, it moves to the succeeded state via arc 770. If the endpoint sends or receives a NOTIFY message containing SIP codes 300-399, it moves to the Redirected state via arc 772.

Figures 8A, 8B:
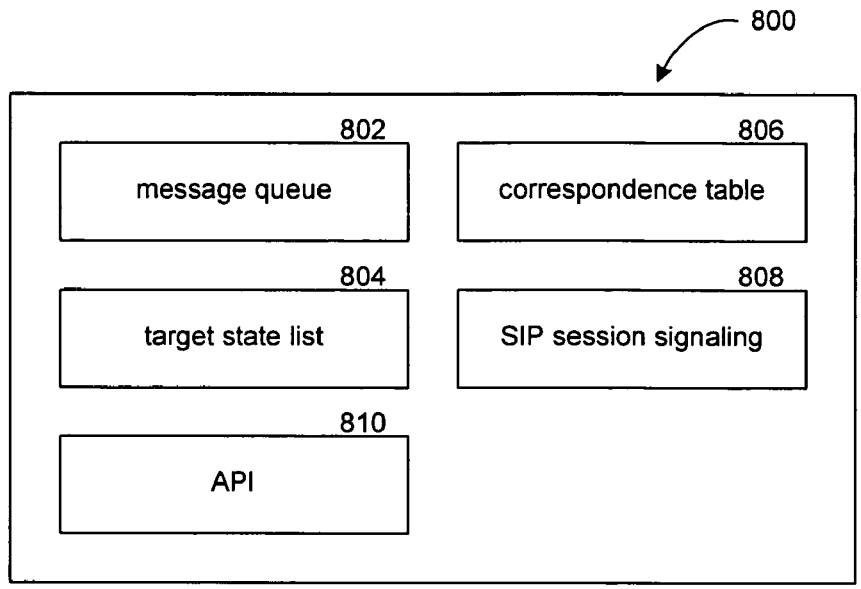
FIG. 8A is a block diagram illustrating components of the facility in various embodiments.
FIG. 8B is a table diagram illustrating a correspondence table employed by the facility in some embodiments.

FIG. 8A is a block diagram illustrating components of the facility in various embodiments. The facility includes components 800 that, acting with other components, manage parallel requests in a communications environment supporting serial and parallel request handlers. In various embodiments, the components are associated with an endpoint. In various embodiments, the components are associated with a device that hosts multiple endpoints. The components include a message queue component 802, a target state list component 804, a correspondence table component 806, a SIP session signaling component 808 (e.g., an object), and an API component 810.

The message queue component 802 stores indications of messages that are to be sent, such as REFER messages. The queue may provide an API for managing the queue, such as to add messages, remove messages, modify messages before they are sent, locate messages, and so forth.

A target state list component 804 stores states relating to other endpoints ("target endpoints") with which the endpoint or computing device communicates. Examples of states are Unknown, Serial (e.g., supports REFER messages in serial), or Parallel (e.g., supports REFER messages in parallel). This state information is employed by various routines associated with the facility, such as the routines provided by the API component 810, to determine how to handle REFER messages the endpoint sends to target endpoints. In some embodiments, the facility stores a single state for a target endpoint with which a SIP session signaling component establishes a session. The SIP session signaling component is described in further detail below.

Some of the routines associated with the facility that use this state information are described in further detail below in relation to FIGS. 9-13. State information is also employed by an API associated with the facility, as is described immediately below.

The facility employs the correspondence table 806 to store relationships between REFER messages, URIs to which the messages are destined, CSeq identifiers, and so forth. The correspondence table is described in further detail below in relation to FIG. 8B.

The SIP session signaling component 808 provides methods and properties relating to the creation, control, and termination of a SIP session.

The API component 810 provides access to the facility's functionality. The API may be employed by applications, services, and other operating system components.

In some embodiments, the API component provides a Refer method. The Refer method is employed by an endpoint to send REFER messages. The Refer method creates and sends a REFER message in association with a SIP session. In various embodiments, the Refer method is provided by a SIP session signaling component and may operate synchronously or asynchronously. In MICROSOFT's .NET environment, methods that start and end asynchronous operations may begin with "Begin" and "End" method names. The following provides a template for the Refer method and related methods:

```
public void Refer(RealTimeAddress referTarget,
            ReferStatus referStatus);
public void Refer(RealTimeAddress referTarget,
            ReferStatus referStatus,
            IEnumerable<SignalingHeader>
      signalingHeaders);
public IasyncResult BeginRefer(...);
public void EndRefer(IasyncResult result);
```

As is indicated by the templates, the Refer method can receive a RealTimeAddress parameter (e.g., a URI), a ReferStatus parameter, and optionally a signaling header parameter. The RealTimeAddress indicates an address of an endpoint to which the REFER message is to be sent. The ReferStatus parameter indicates a ReferStatus object that the endpoint employs to store the states of sent REFER messages. Possible states are indicated in FIG. 7 and described above in relation to that figure. An event handler may be invoked by the facility when the state changes, such as when a NOTIFY message is received in response to the sent REFER message. This event handler may modify the state indicated by the ReferStatus object. The ReferStatus object may provide various methods and properties, including the following: (1) an IsSubscriptionActive method returns an indication of whether further state changes are possible; (2) a State method returns a state indicated by the ReferStatus object; (3) a UserState property can be set or retrieved by an application that employs the API; (4) a StateChanged event fires when the state changes; and (5) a Session property provides an indication of the SIP session signaling component that is associated with the Refer method. The StateChanged event has the following properties that an event handler can examine: (1) a state to which the ReferStatus object is moving; (2) a previous state from which the ReferStatus object is moving; (3) a string or other data object providing the body of an incoming NOTIFY message that is causing the state to change; (4) a SIP code indicated by the NOTIFY message; and (5) signaling headers in the NOTIFY message.

An endpoint that receives the REFER message also employs the API component to receive REFER messages and send NOTIFY messages in response. The API can thus be employed by an application that registers to receive notifications using the REFER messages. The application (or endpoint) seeking to receive REFER messages and send NOTIFY messages in response registers an event handler with the SIP session signaling component. A handler for receiving REFER messages is registered with a SIP session signaling object as follows:

SIPSession.ReferReceived+=HandleReferReceived;

The API component then invokes the HandleReferReceived method when the endpoint receives a REFER message. By invoking an Accept or Decline method, the handler can either accept or decline the incoming REFER messages. As an example, the REFER message may request a particular service. The handler can inspect the REFER message, determine whether or not to accept the request, and then invoke the appropriate method. The handler can also invoke other functions that provide responses, such as a Trying method. The Trying method provides a NOTIFY message containing the Trying SIP code. A template for the HandleReferReceived method follows.

```
void HandleReferReceived(object sender,
    ReferReceivedEventArgs e)
```

The sender parameter provides an object representing the sender of the REFER message. As an example, the sender parameter can be a SIP session signaling component. The second parameter to the HandleReferReceived method provides event arguments (e.g., parameters) relating to the REFER message. The event arguments include, e.g., (1) a target for the REFER message; and (2) signaling header fields contained in the REFER message.

The API component also provides a ReferNotifier object that a target endpoint or application that receives a REFER message can use to send a NOTIFY message to the endpoint that sent the REFER message. The target endpoint or application may accept a REFER message, in which case it receives a ReferNotifier object. The ReferNotifier object provides a SetState method. Templates for the SetState method follow.

```
public void SetState(ReferState state);
public void SetState(int responseCode, string
responseText,
            string remaingingSipFrag);
```

The SetState method can be invoked synchronously or asynchronously. When invoked, the SetState method sets the state of the endpoint receiving the REFER message. In various embodiments, the SetState method receives a state parameter or parameters that are indicated in a responsive NOTIFY message, such as a SIP code, text, and message body. The ReferNotifier object also provides various properties, such as a state indicated by a last message sent by the endpoint that sent the NOTIFY message, an address of the target for the REFER message (e.g., URI), and the SIP session signaling object with which the ReferStatus object is associated. The first implementation of the SetState method can be invoked by providing a state as follows:

SetState (ReferStatus.Trying);

This method invocation sets the state to Trying.

FIG. 8B is a table diagram illustrating a correspondence table employed by the facility in some embodiments. The table includes an identification number of sent messages 850, a target URI for the messages 852, a CSeq number associated with each sent message 854, and a ReferStatus object indication 855. The identification number can be used to determine an order in which the messages were sent. The URI indicates the target for each message. The CSeq is the identifier associated with each message. The ReferStatus object indication for a row provides an indication, such as a pointer, to a ReferStatus object associated with the REFER message corresponding to the row.

The following describes the example illustrated in the table. A message number 1 (856) was sent with a URI indicated as 128.51.120.8 and having CSeq 12. Message number 2 (858) was sent with a URI indicated as 128.52.125.2 and having CSeq 1. Message number 3 (860) was sent to the same URI and having CSeq 4. Other messages may have been sent before, after, or between these messages. These indications can be removed, such as after a dialog completes or the indications are no longer needed in the table.

As described above in relation to FIG. 8A, in some embodiments, an instance of the facility functions in relation to a single target URI, such as a URI with which the SIP session signaling component has established a session. In these embodiments, the correspondence table may contain only messages sent to that target URI. As an example, only message numbers 2 and 3 may appear. As a result, the correspondence table indicates separate REFER messages to which the facility is awaiting NOTIFY response messages. This may occur when an application employs the facility to send multiple REFER messages to the target URI, such as to request multiple services.

While FIG. 8B illustrates a table whose contents and organization are designed to make them more comprehensible by a human reader, those skilled in the art will appreciate that actual data structures used by the facility to store this information may differ from the table shown, in that they, for example, may be organized in a different manner, may contain more or less information than shown, may be compressed and/or encrypted, etc.

Figure 9:
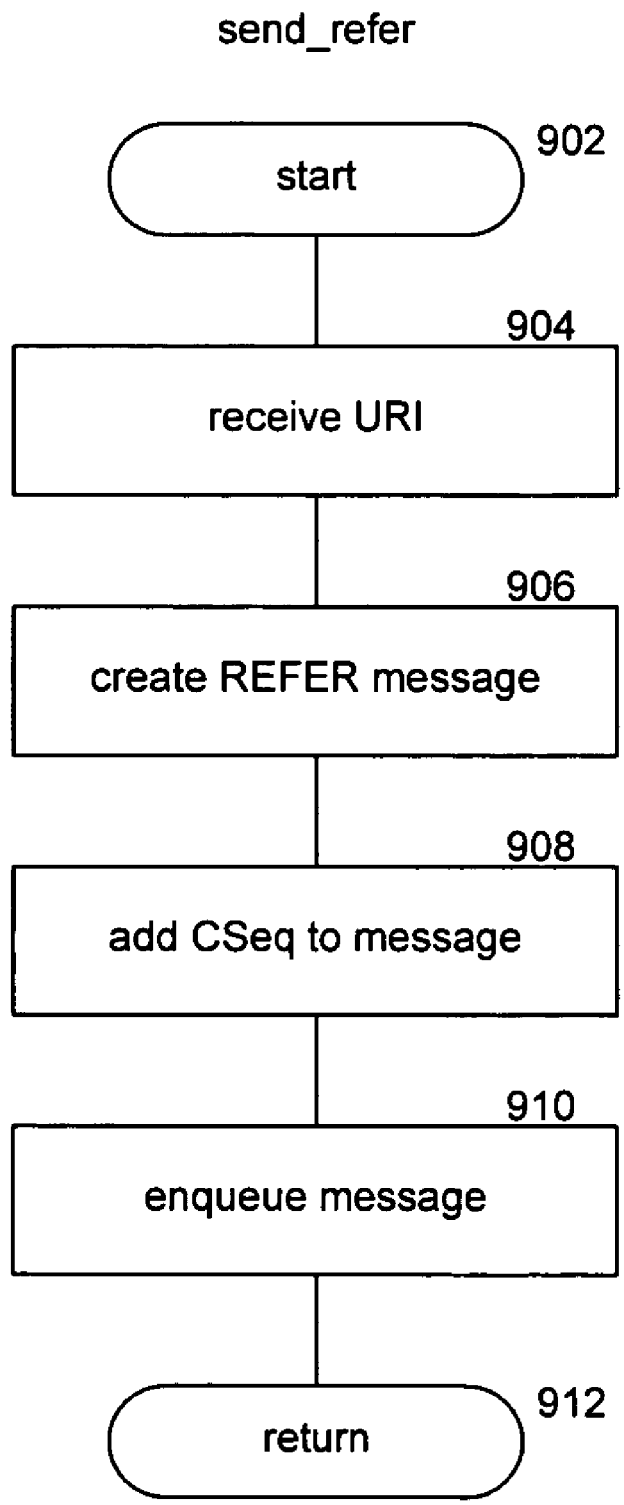
FIG. 9 is a flow diagram illustrating a send_refer routine invoked by the facility in some embodiments.

FIG. 9 is a flow diagram illustrating a send_refer routine invoked by the facility in some embodiments. The facility invokes the send_refer routine to send a REFER message. The routine begins at block 902.

At block 904, the routine receives a URI indicating the target for the message. As an example, a component or object that invokes the send_refer routine may provide the indication of the URI.

At block 906, the routine creates the REFER message.

At block 908, the routine adds a CSeq identifier to the message. As an example, the routine may add the following header field to the message:

CSeq: 12 REFER

At block 910, the routine enqueues the created REFER message. To enqueue the message, the routine may store the message in the message queue or may invoke a routine provided by the message queue component to add the message to the message queue.

At block 912, the routine returns.

Figure 10:
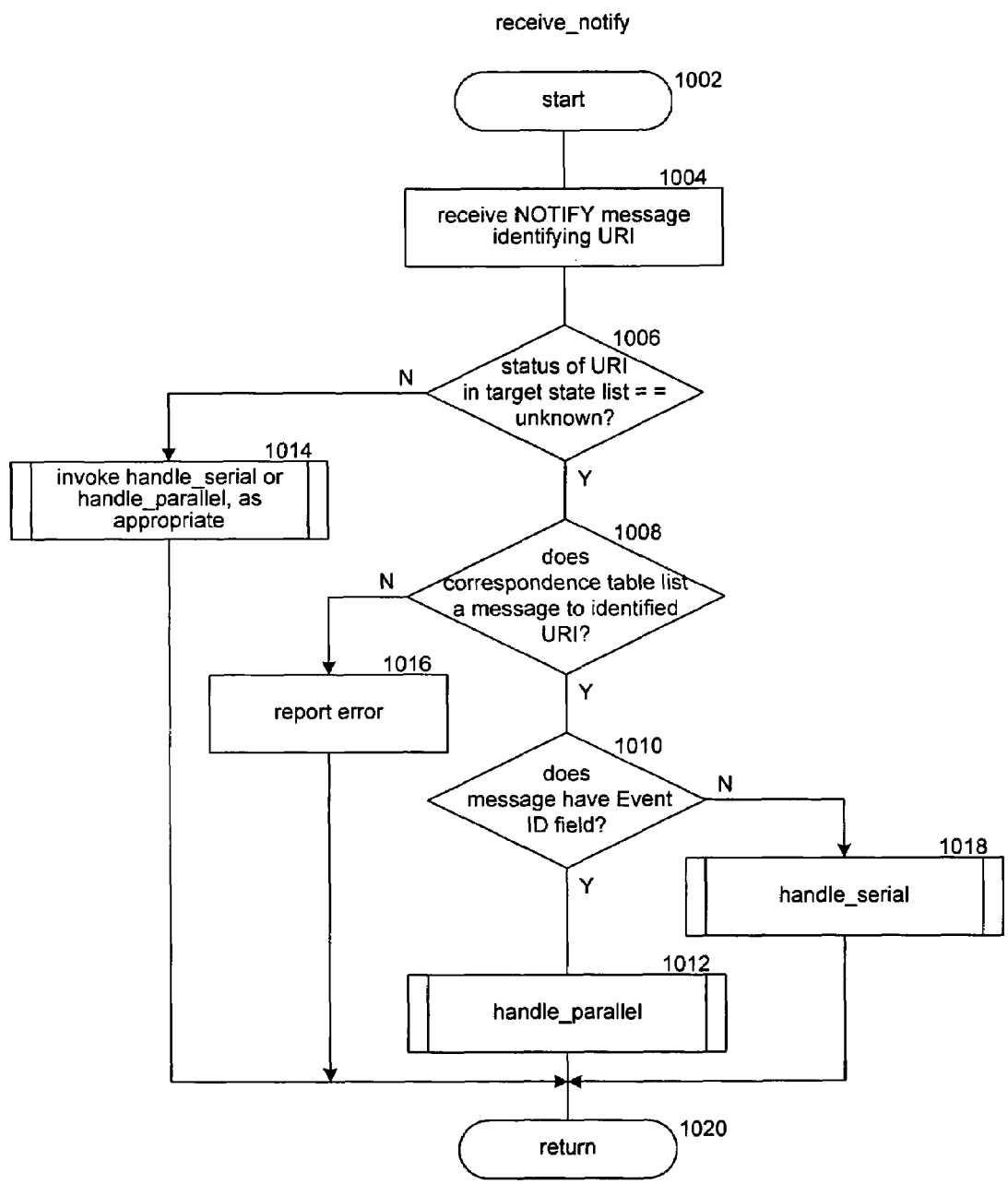
FIG. 10 is a flow diagram illustrating a receive_notify routine invoked by the facility in some embodiments.

FIG. 10 is a flow diagram illustrating a receive_notify routine invoked by the facility in some embodiments. The facility invokes the routine when it receives a NOTIFY message. The routine begins at block 1002.

At block 1004, the routine receives the NOTIFY message. The message may identify the URI to which a REFER message was sent.

At block 1006, the routine determines whether the status of the identified URI in the target state list is unknown. The state of the URI is initially unknown until the facility has determined whether that URI accepts REFER messages in parallel or serial and resets the status accordingly. If the status of the URI in the target state list is unknown, the routine continues at block 1008. Otherwise, the routine continues at block 1014.

At block 1008, the routine determines whether the correspondence table indicates that a REFER message has been sent to the identified URI for which a response is pending. A REFER message has been sent to the identified URI for which a response is pending when the table contains an entry for the identified URI. If there is such an entry, the routine continues at block 1010. Otherwise, the routine continues at block 1016.

At block 1010, the routine determines whether the message contains an Event ID field in the header of the received message. If the message contains an Event ID field, the routine continues at block 1012. Otherwise, the routine continues at block 1018. The existence of an Event ID field is an indication that the target endpoint is capable of handling REFER messages in parallel. In various embodiments, the routine may additionally determine whether the Event ID field contains an appropriate response. An example of an appropriate response to the CSeq identifier provided as an example above in relation to block 908 follows:

Event: refer; id=12

At block 1012, the routine invokes a handle_parallel subroutine to handle the incoming NOTIFY message. The handle_parallel subroutine is described in further detail below in relation to FIG. 12.

At block 1014, because the status of the identified URI is known, the routine invokes a handle_serial or a handle_parallel subroutine to handle the incoming NOTIFY message, as appropriate, and then continues at block 1020 where it returns.

At block 1016, because a NOTIFY message was received that does not correspond to a REFER message, the routine reports an error and continues at block 1020 where it returns.

At block 1018, the routine invokes a handle_serial subroutine to handle the incoming NOTIFY message. The handle_serial subroutine is described in further detail below in relation to FIG. 11.

At block 1020, the routine returns.

Figure 11:
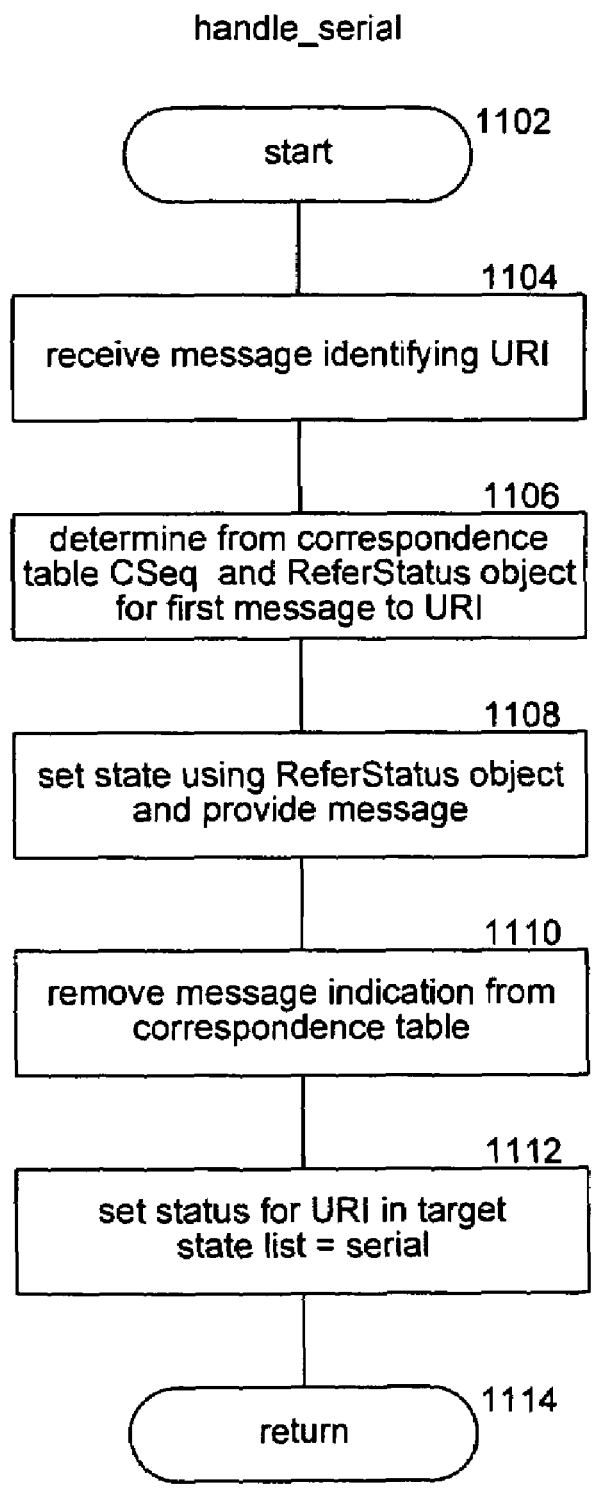
FIG. 11 is a flow diagram illustrating a handle_serial routine invoked by the facility in some embodiments.

FIG. 11 is a flow diagram illustrating a handle_serial routine invoked by the facility in some embodiments. The facility employs the routine when it has determined that the target URI handles REFER messages serially. The routine begins at block 1102.

At block 1104, the routine receives a NOTIFY message identifying a URI.

At block 1106, the routine determines from the correspondence table the CSeq identifier and ReferStatus object for the first message the endpoint sent to the identified URI. The routine retrieves this CSeq identifier because the endpoint that sent the NOTIFY message did not provide the CSeq identifier that was provided in the REFER message. In some embodiments, the routine may simply use the first entry in the correspondence table.

At block 1108, the routine sets the state for the endpoint, such as based on the received message, and provides the message to the user of the facility, such as to an application that employs the facility. The routine may set the state by using a method provided by the ReferStatus object identified at block 1106.

At block 1110, the routine removes the message indication from the correspondence table. As a result, during the next indication of the handle_serial routine, the CSeq identifier for the next message to the identified URI would be retrieved from the correspondence table. By removing the message indication entry from the correspondence table after receiving a NOTIFY message, the facility is able to process the next REFER message in the correspondence table when the routine is invoked again.

At block 1112, the routine sets the status as "Serial" for the identified URI in the target state list. Thus, when the endpoint sends further REFER messages to the identified URI, it would send the REFER messages serially.

At block 1114, the routine returns.

Figure 12:
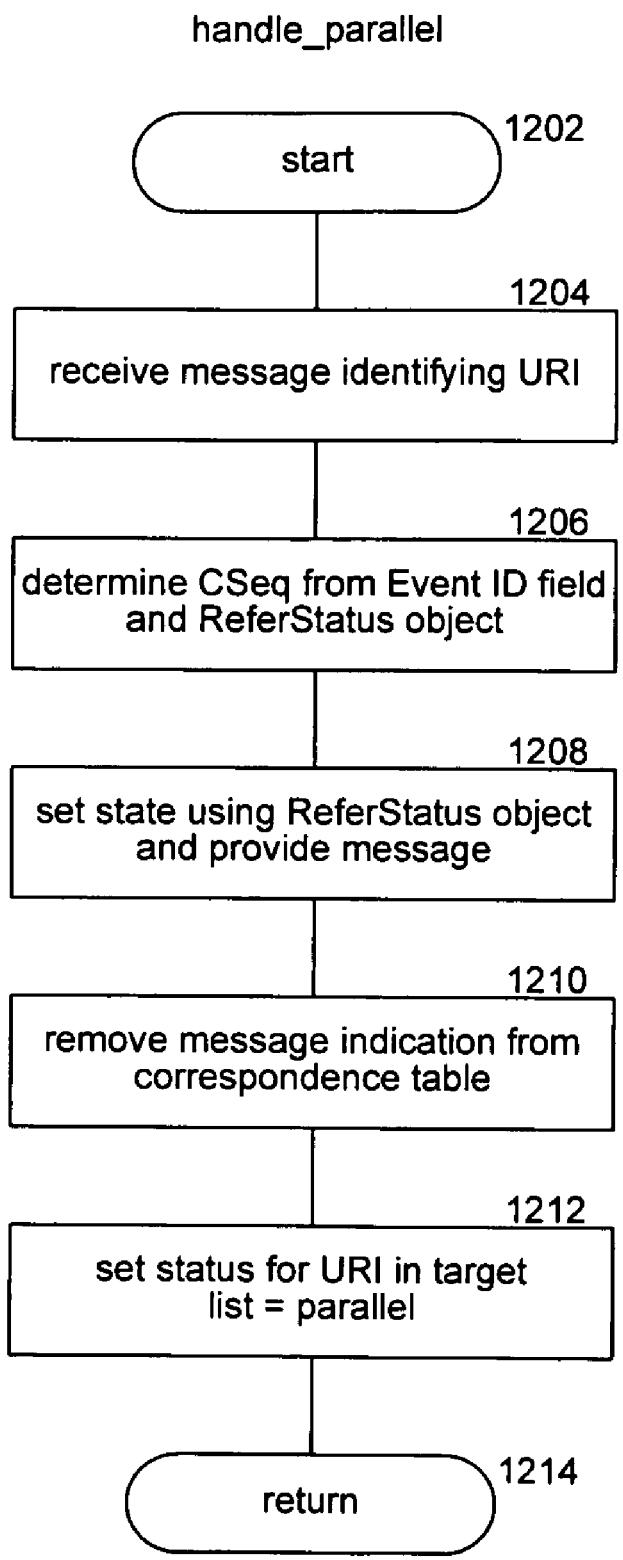
FIG. 12 is a flow diagram illustrating a handle_parallel routine invoked by the facility in some embodiments.

FIG. 12 is a flow diagram illustrating a handle_parallel routine invoked by the facility in some embodiments. The facility employs the routine when it has determined that the target URI handles REFER messages in parallel. The routine begins at block 1202.

At block 1204, the routine receives a NOTIFY message indicating a URI.

At block 1206, the routine determines a CSeq identifier from the Event ID field provided in the NOTIFY message. In some embodiments, the routine may employ the CSeq indicated in the correspondence table. The routine may also determine the ReferStatus object associated with the REFER message corresponding to the received NOTIFY message.

At block 1208, the routine sets the state for the endpoint, such as based on the received message, and provides the message to the user of the facility, such as to an application that employs the facility. The routine may set the state by using a method provided by the ReferStatus object identified at block 1206.

At block 1210, the routine removes the message indication from the correspondence table. By removing the message indication entry from the correspondence table after receiving a NOTIFY message, the facility does not again need to consider a REFER message for which a NOTIFY message has already been received.

At block 1212, the routine sets the status as "Parallel" for the identified URI in the target state list. Thus, when the endpoint sends further REFER messages to the identified URI, it would send the REFER messages in parallel.

At block 1214, the routine returns.

In some embodiments, the handle_parallel routine and the handle_serial routine described above in relation to FIG. 11 may be provided by the same method with perhaps one or more parameters indicating which method is to be used.

Figure 13:
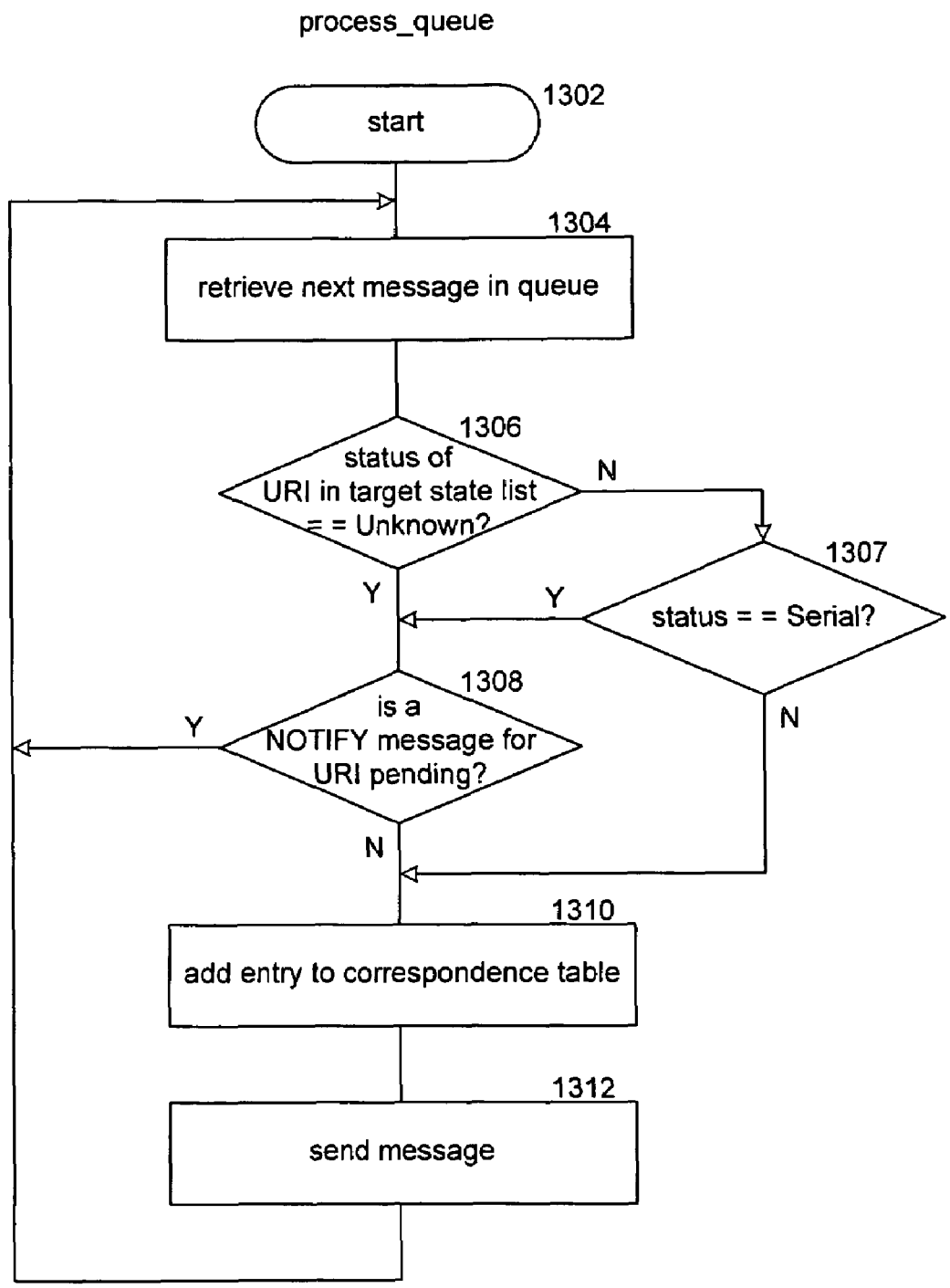
FIG. 13 is a flow diagram illustrating a process_queue routine invoked by the facility in some embodiments.

FIG. 13 is a flow diagram illustrating a process_queue routine invoked by the facility in some embodiments. The facility invokes the process_queue routine to process outgoing REFER messages that are waiting in the message queue. The routine begins at block 1302.

At block 1304, the routine retrieves the next REFER message waiting in the queue. The message identifies a target URI for the message.

At block 1306, the routine determines whether the status of the URI indicated for the outgoing REFER message does not appear in the target state list or is indicated in the target state list as Unknown. If the status of the URI is unknown or does not appear in the list, the routine continues at block 1308. Otherwise, the routine continues at block 1307.

At block 1308, the routine determines whether a NOTIFY message is already pending for the identified URI. When the status for the identified URI is Unknown or Serial, the endpoint assumes that the URI is incapable of handling REFER messages in parallel. Consequently, the routine continues at block 1304. Otherwise, the routine continues at block 1310.

At block 1307, the routine determines whether the status for the identified URI is Serial. If the status for the identified URI is Serial, the routine continues at block 1308. Otherwise, the routine assumes that the status for the identified URI is Parallel and continues at block 1310.

At block 1310, the routine adds an entry to the correspondence table indicating that a REFER message has been sent to the identified URI. The routine also identifies the CSeq corresponding to this message in the correspondence table.

At block 1312, the routine sends the message to the identified URI. The routine then continues at block 1304.

Thus, when the status for the identified URI is Unknown or Serial, the routine sends REFER messages only when no REFER messages are pending. Otherwise, the routine sends all messages in the queue destined to the identified URI.

It is possible, due to network race conditions and proxy behavior, for a response to a REFER message to arrive after a corresponding NOTIFY message. In such cases, the facility processes messages out of order in some embodiments. As an example, the state can move to "refer accepted" after the NOTIFY message arrives because a NOTIFY would not be sent if the REFER message was rejected. When the non-NOTIFY response arrives, it can be discarded. In other embodiments, NOTIFY messages arriving before other responses to the REFER message are queued and processed in order. An early NOTIFY message can be detected because the Event ID field will correspond to the CSeq identifier of a REFER transaction that has not completed. If there is no Event ID field and there is a single REFER transaction that is not completed, then the arriving NOTIFY message can be correlated to that transaction.

Those skilled in the art will appreciate that the logic illustrated in FIGS. 9-13 and corresponding description may be altered in various ways. For example, the order of the blocks may be rearranged, substeps may be performed in parallel, shown logic may be omitted, other logic may be included, etc.

From the foregoing, it will be appreciated that specific embodiments of the invention have been described herein for purposes of illustration, but that various modifications may be made without deviating from the spirit and scope of the invention. As an example, the facility functions with protocols other than SIP. Although the subject matter has been described in language specific to structural features and/or methodological arts, it is to be understood that the subject matter defined in the appended claims is not necessarily limited to the specific features or acts described above. Accordingly, the invention is not limited except as by the appended claims.

We claim:

1. A method performed by a computer system for managing parallel processing of requests in a Session Initiation Protocol (SIP) communications environment including devices that support either parallel or serial processing of requests, comprising:
   enqueing a request message that is to be sent to a recipient computing device,
   the request message containing a conversation identifier but without specifying or requesting parallel processing of request messages;
   sending the request message to the recipient computing device;
   receiving a response from the recipient computing device;
   determining from the received response whether it contains the conversation identifier;
   if the received response contains the conversation identifier, determining that the recipient computing device supports parallel processing of request messages; and
   if the received response does not contain the conversation identifier, determining that the recipient computing device supports serial processing of request messages;
   if the recipient supports parallel processing of request messages, sending subsequent request messages to the recipient computing device without awaiting a response to a previously sent request message; and
   if the recipient supports serial processing of request messages, sending a subsequent request message to the recipient computing device after receiving a response to a previously sent request message;
   wherein request messages and received responses are exchanged using SIP.

2. The method of claim 1 further comprising adding the conversation identifier as a CSeq header field of the sent message.

3. The method of claim 2 further comprising receiving the conversation identifier in an Event header field of the received response.

4. The method of claim 3 wherein the conversation identifier is provided as a parameter of the Event header field.

5. The method of claim 1 further comprising providing an application program interface for receiving the request message.

6. The method of claim 5 wherein an application employing the application program interface does not have information relating to whether the recipient computing device supports parallel processing of request messages.

7. A computer system having a processor and memory for managing parallel requests in a Session Initiation Protocol (SIP) communications environment including request processors that support either parallel or serial processing of requests, comprising:
   a message queue component that stores request messages that are to be sent to a recipient endpoint, the request messages containing a header field indicating a conversation identifier and a indicating a recipient for the request messages;
   a correspondence table component that associates the conversation identifier and recipient for each request message;
   a target state list component that stores a state for each request message recipient; and
   an application program interface component that receives a request, creates a message, associates the request message with a conversation identifier, wherein the request message does not specify or request parallel processing of request messages, stores the request message in the message queue, sends the request message to the recipient, stores in the correspondence table an association between the conversation identifier and recipient indicated for the request message, receives from the recipient a response to the request message, determines from the received response whether it contains the conversation identifier; if the received response contains the conversation identifier, determines from the conversation identifier of the received response that the recipient supports parallel processing of request messages; if the received response does not contain the conversation identifier, determines that the recipient supports serial processing of request messages; stores in the target state list a state indicating whether the recipient supports parallel or serial processing of request messages; if the recipient supports parallel processing of request messages, sends subsequent messages to the recipient without awaiting a response to a previously sent request message; and if the recipient supports serial processing of request messages, sends subsequent request messages after receiving a response to a previously sent request message, wherein request messages and received responses are exchanged using SIP.

8. The system of claim 7 wherein the application program interface component adds the conversation identifier in a CSeq header field of the request message.

9. The system of claim 8 wherein the application program interface component determines that the recipient supports parallel processing of request messages when the response includes the conversation identifier in an Event header field.

10. The system of claim 7 wherein the sent request message is a REFER message.

11. The system of claim 7 wherein the received response is a NOTIFY message.

12. The system of claim 7 wherein the application program interface provides a method that an application can employ to send multiple requests to the recipient without the application needing information as to whether the recipient supports parallel processing of request messages.

13. A computer-readable storage medium encoded with computer-executable instructions that cause a computer processor in a Session Initiation Protocol (SIP) communications environment supporting serial and parallel request processors to perform a method comprising:

receiving from an application request messages directed to a recipient wherein the request messages contain a conversation identifier but do not specify or request parallel processing of request messages;

sending to the recipient without a first request message without sending to the recipient request messages subsequently received from the application;

upon receiving a response from the recipient to the first message, determining by the sender of the first request message whether the received response contains the conversation identifier;

if the received response contains the conversation identifier, determining from the conversation identifier of the received response that the recipient supports parallel processing of request messages;

if the received response does not contain the conversation identifier, determining that the recipient supports serial processing of request messages;

if the recipient supports parallel processing of request messages, sending subsequently received request messages to the recipient without awaiting a response to a previously sent request message before sending another request message; and if the recipient supports serial processing of request messages, sending a subsequent request message after receiving a response to a previously sent request message wherein request messages and received responses are exchanged using SIP.

14. The computer-readable storage medium of claim 13 wherein the first request message is a SIP REFER message providing the conversation identifier in a CSeq header field.

15. The computer-readable storage medium of claim 14 wherein the response is a SIP NOTIFY message providing the conversation identifier in an Event header field.

16. The computer-readable storage medium of claim 13 wherein the request message is received from an application that does not have information relating to whether the recipient supports parallel processing of request messages.

\* \* \* \* \*